United States Patent
Ray (10) Patent No.: US 11,181,807 B1
(45) Date of Patent: Nov. 23, 2021

(54) RANGING OF OBJECTS IN A SCENE USING DIFFERENCE IMAGING AND FAST SHUTTER CONTROL

(71) Applicant: Rosemount Aerospace Inc., Burnsville, MN (US)

(72) Inventor: Mark Ray, Burnsville, MN (US)

(73) Assignee: ROSEMOUNT AEROSPACE INC., Burnsville, MN (US)

(*) Notice: Subject to any disclaimer, the term of this patent is extended or adjusted under 35 U.S.C. 154(b) by 0 days.

(21) Appl. No.: 16/946,988

(22) Filed: Jul. 14, 2020

(51) Int. Cl.
*G03B 9/08* (2021.01)
*G01S 17/89* (2020.01)
*G03B 9/14* (2021.01)
*H04N 5/235* (2006.01)

(52) U.S. Cl.
CPC ............. *G03B 9/14* (2013.01); *H04N 5/2353* (2013.01); *H04N 5/2354* (2013.01); *G01S 17/89* (2013.01)

(58) Field of Classification Search
CPC .................................. G03B 9/14; G03B 13/20
See application file for complete search history.

(56) References Cited

U.S. PATENT DOCUMENTS

| | | | |
|---|---|---|---|
| 4,708,473 A | * | 11/1987 | Metzdorff ............... G01S 17/18 356/5.04 |
| 7,420,656 B1 | | 9/2008 | Sandusky et al. |
| 7,995,191 B1 | | 8/2011 | Sandusky |
| 8,471,895 B2 | | 6/2013 | Banks |
| 8,804,101 B2 | | 8/2014 | Spagnolia et al. |
| 10,104,365 B2 | | 10/2018 | Banks et al. |
| 10,218,962 B2 | | 2/2019 | Banks |
| 10,390,004 B2 | | 8/2019 | Grauer et al. |
| 2019/0174076 A1 | | 6/2019 | Stettner et al. |
| 2019/0208183 A1 | | 7/2019 | Schmidt et al. |

* cited by examiner

*Primary Examiner* — Minh Q Phan
(74) *Attorney, Agent, or Firm* — Kinney & Lange, P.A.

(57) ABSTRACT

Apparatus and associated methods relate to ranging of objects in a scene based on difference images indicative of only objects in the scene that have ranges within a subrange. The difference images are calculated by taking differences of two images, each of which captures light reflected by objects in the scene that have ranges within range domains that are different from one another. Thus, each of the difference images includes light reflected by only those objects located at ranges that are included in one of the range domains but not the other. These range domains are controlled by the timing of operation of a fast shutter. In some embodiments, the fast shutter includes an electro-optical modulator between two polarizing filters. The electro-optical modulator can rapidly change the polarization of the light transmitted therethrough such that the second polarizing filter either transmits or blocks the light.

20 Claims, 5 Drawing Sheets

RANGING OF OBJECTS IN A SCENE USING DIFFERENCE IMAGING AND FAST SHUTTER CONTROL

BACKGROUND

Flash lidar, in contrast to a flying-spot scanning lidar, detects and determines the ranges of objects in a scene simultaneously over multiple fields-of-view. The data form a "point cloud" of object elevation, azimuth, and range measurements all acquired within a single sampling period (usually one pulse from a laser). This Invention Disclosure describes a variant of flash lidar that uses an electro-optic (EO) polarization modulator to generate a point cloud from individual range-resolved images acquired by a focal plane array. The point cloud generated by this lidar is not generated from a single laser pulse; it requires multiple laser pulses to map the full depth of the scene.

For some flash lidars, the focal plane detector is an array of high-speed, high-gain photodiodes that acquire simultaneous streams of light echoes, one for each pixel in the array. All of the pixel streams are combined to form the single point cloud of the scene. Since all of the pixels are sampled individually for each laser pulse, the array size is limited to ~100×100, and the read-out circuit can be complex. Consequently, the lateral angular resolution of the point cloud is limited, and the cost and complexity of this type of flash lidar may be prohibitive for some applications, despite its high longitudinal spatial resolution and fast data acquisition speed. [See McManamon et al., "Comparison of flash lidar detector options," Optical Engineering 56(3), 031223 (2017)]. An alternative approach to the high-speed photodiode array is a CCD or CMOS array with an electro-optic (EO) modulator. The modulator rather than the focal plane array is the high-speed element that resolves the range through a time-of-flight technique. The small pixel size and large array sizes of inexpensive digital cameras make them a good alternative to the photodiode arrays.

SUMMARY

Apparatus and associated methods relate to a system for ranging of objects in a scene. The system includes an optical pulse projector configured to project a time sequence of optical pulses onto the scene. The system includes an optical imager having an optical axis aligned so as to receive reflected portions of the time sequence of optical pulses projected onto a scene and reflected by the objects in the scene. Based on the reflected portions received, the optical imager forms a time sequence of two-dimensional images of the scene, each corresponding to a corresponding one of the time sequence of optical pulses projected. The system includes a fast shutter aligned along the optical axis of the optical imager so as to controllably transmit the reflected portions to the optical imager and/or block the reflected portions from the optical imager. The system includes a timing controller configured to coordinate shutter timing of the fast shutter, so as to transmit the reflected portions to the optical imager for object having ranges within a range domain and to block the reflected portions from the optical imager for objects not within the range domain. The system includes an image processor configured to generate difference images between two of the time sequence of two-dimensional images captured using two different shutter timings corresponding to two different range domains. The system also includes a range calculator configured to determine the ranges of objects identified in the difference images as being within a subrange calculated as being a difference between the range domains of the two of the sequence of two-dimensional images used to calculate the difference image.

Some embodiments relate to a method for ranging of objects in a scene. The method includes projecting, via an optical pulse projector, a time sequence of optical pulses onto the scene. The method includes forming, via an optical imager having an optical axis aligned so as to receive reflected portions of the time sequence of optical pulses projected onto a scene and reflected by the objects in the scene, a time sequence of two-dimensional images of the scene, each corresponding to a corresponding one of the time sequence of optical pulses projected. The method includes controllably transmitting and/or blocking, via a fast shutter aligned along the optical axis of the optical imager, the reflected portions to and/or from the reflected portions from the optical imager. The method includes coordinating, via a timing controller, shutter timing of the fast shutter, so as to transmit the reflected portions to the optical imager for object having ranges within a range domain and to block the reflected portions from the optical imager for objects not within the range domain. The method includes generating, via an image processor, difference images between the two of the time sequence of two-dimensional images captured using two different shutter timings corresponding to two different range domains. The method also includes determining, via a range calculator, the ranges of objects identified in the difference images as being within a subrange calculated as being a difference between the range domains of the two of the sequence of two-dimensional images used to calculate the difference image.

DETAILED DESCRIPTION

Apparatus and associated methods relate to ranging of objects in a scene based on difference images indicative of the objects in the scene that have ranges within a subrange. The difference images are calculated by taking differences of two images, each of which captures light reflected by objects in the scene that have ranges within range domains that are different from one another. Thus, each of the difference images will include light reflected by only those objects located at ranges that are included in one of the range domains but not the other of the range domains of the two images. These range domains are controlled by the timing of a fast shutter. In some embodiments, the fast shutter includes an electro-optical modulator between two polarizing filters. The electro-optical modulator can rapidly change the polarization of the light transmitted therethrough such that the second polarizing filter either transmits or blocks the light.

Figure 1:
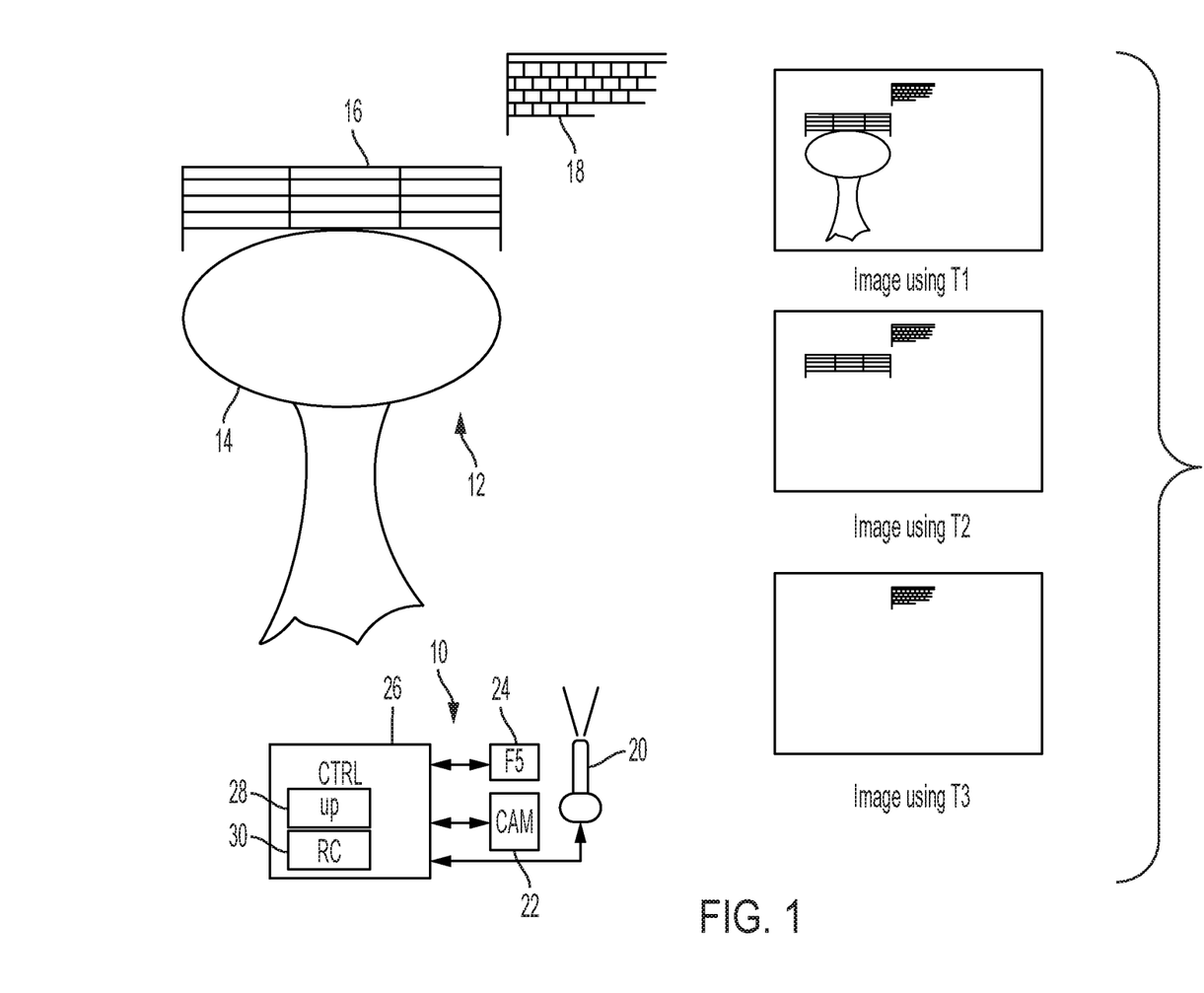
FIG. 1 depicts an embodiment of an object ranging system using fast shutter operation to capture range-slice imagery

FIG. 1 depicts an embodiment of an object ranging system using fast shutter operation to capture range-slice imagery. In FIG. 1, object ranging system 10 is shown ranging objects in scene 12. Scene 12 includes tree 14, with its diffuse leafy crown, and solid objects 16 and 18. Object ranging system 10 includes optical pulse projector 20, optical imager 22, fast shutter 24, timing controller 26, image processor 28 and range calculator 30. Together, components 20, 22, 24, 26, 28 and 30, are coordinated so as to calculate ranges to objects 14, 16 and 18 in scene 12 by measuring times of flight of optical pulses projected onto scene 12, reflected by objects 14, 16 and 18, and imaged by optical imager 22. The times of flight of such optical pulses are indicative of range to objects 14, 16 and 18, the longer the time of flight the greater the range of the object. Times of flight of optical pulses are not directly measured by ranging system 10, but are computed by creating time-slice windows, during which reflected portions of the projected pulses are transmitted, by fast shutter 24, to optical imager 22 for image capture.

For example, optical projector 20 can project an optical pulse onto scene 12. Portions of the projected optical pulse will be reflected by objects 14, 16 and 18 in scene 12. Times of flight for these portions of the projected optical pulse to travel from optical pulse projector 20 to objects 14, 16 and 18, and then return to optical imager 22 are a function of range of objects 14, 16 and 18 from optical pulse projector 20 and optical imager 22. These times of flight are relatively small for objects at ranges close to optical pulse projector 20 and optical imager 22 and are relatively large for objects at ranges distant from optical pulse projector 20 and optical imager 22. Fast shutter 24 is configured to either transmit, to optical imager 22, the portions of the projected optical pulse reflected by objects in scene 12 or to block, from optical imager 22, the portions of the projected pulse reflected by objects in scene 12. Fast shutter 24 is called "fast" because transition between transmitting, to optical imager 22, and blocking, from optical imager 22, of reflected portions can be controlled at a shutter-transition time soon after a projection time $T_0$ at which the optical pulse is projected. This shutter-transition time corresponds to a transition range separating a transmitted range domain from a blocked range domain. Portions of the projected optical pulse reflected by objects within the transmitted range domain will be imaged by optical imager 22, while portions of the projected optical pulse reflected by objects within the blocked range domain will not be imaged by optical imager 22.

For example, if fast shutter 24 is initially open at the projection time $T_0$ and then closed at transition time $T_1$ following the projection time $T_0$, then objects that have a range less than the transition range $R(T_1)$ of optical pulse projector 20 and optical imager 22 will be imaged, and objects having a range greater than the transition range $R(T_1)$ will not be imaged. The transition range corresponding $R(T_1)$ corresponding to transition time $(T_1)$ is given by:

$$R(T_1) = \frac{cT_1}{2}, \quad (1)$$

where c is the speed of light in the atmosphere. Equation 1 yields the correct transition range assuming that optical pulse projector 20 and optical imager 22 are collocated with one another.

Conversely, if fast shutter 24 is initially closed at the projection time $T_0$ and then opened at transition time $T_1$ following the projection time $T_0$, then objects that have a range less than the transition range $R(T_1)$ of optical pulse projector 20 and optical imager 22 will not be imaged, and objects having a range greater than the transition range $R(T_1)$ will be imaged.

A series of images can be captured using a corresponding series of projected optical pulses and shutter transition times $T_1$, $T_2$ and $T_3$. Each of the images can be configured to capture portions of the corresponding projected pulse reflected by objects within the transmitted range domain corresponding to the shutter transition time $T_N$ used for that image. For example, a series of images can be captured for shutter transition times $T_1$, $T_2$ and $T_3$, as indicated in FIG. 1. In FIG. 1, fast shutter 24 is initially closed at projection time $T_0$ and then opened at transition times $T_1$, $T_2$ and $T_3$ following projection of an optical pulse. Thus, each of the images will capture portions of the projected optical pulses reflected by objects beyond the transition range corresponding to the transition time $T_N$. Thus, the first image, depicted in the top right-hand corner of FIG. 1, in which transition time $T_1$ is used, will capture tree 14, and solid objects 16 and 18. The second image depicted in FIG. 1, in which transition time $T_2$ is used, will not capture tree 14, but will capture solid objects 16 and 18. The third image depicted in FIG. 1, in which transition time $T_3$ is used, will not capture tree 14 or solid object 16, but will capture solid object 18.

This series of images can be used to determine the range of objects 14, 16 and 18. For example, a difference image can be generated using the first and second images. Because solid objects 16 and 18 are captured in both of the first and second images, a difference image will substantially annihilate objects 16 and 18, as both objects 16 and 18 would be similarly illuminated in the two images. Because only the first image captures tree 14, a difference image will leave tree 14 imaged. Thus, objects that are imaged in the difference image between the first and second images have ranges between transition ranges $R(T_2)$ and $R(T_1)$. In a similar fashion, objects that are imaged in the difference image between the second and third images have ranges between transition ranges $R(T_3)$ and $R(T_2)$. Objects that are imaged in the difference image between the third and fourth images have ranges between transition ranges $R(T_4)$ and $R(T_3)$. In FIG. 1, graphs corresponding to a single pixel image data are shown, as well as graphs corresponding to difference image data as described above.

Timing controller 26 controls operation of fast shutter 24 by generating a timing-control signal and sending the timing control signal generated to fast shutter 24. The timing control signal controls timing of shutter transition between transmitting and blocking of the reflected portions so as to control the range domain in which objects located will be illuminated in the images captured by optical imager 22. Timing controller 26 can include a microprocessor and a clock, or any other time control system capable of controlling timing with timing resolution of 1, 2, 5, 10, 15 nanoseconds.

Image processor 28 can be any of the various semiconductor devices, and/or image processing systems that are configured to perform image processing operations that include difference imaging. In some embodiments, image processor 28 is configured to map adjacent-in-time images onto one another so as to calculate and/or compensate for relative motion between object ranging system 10 and scene 12. Range calculator 30 can be any of the various processors used to perform mathematical range computations, such as, for example, equation (1), described above. In some embodiments, timing controller 26, image processor 28, and range calculator 30 are software components executed by a common or shared processing system.

For instance, a shared processor can be one capable of processing instructions stored in a storage device. Examples of such a processor can include any one or more of a microprocessor, a controller, a digital signal processor (DSP), an application specific integrated circuit (ASIC), a field-programmable gate array (FPGA), or other equivalent discrete or integrated logic circuitry. Store program modules can be retrieved for the storage device and executed by the shared process to perform the operations specific to timing controller 26, image processor 28, and range calculator 30.

The storage device, in some examples, can be described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, the storage device is a temporary memory, meaning that a primary purpose of the storage device is not long-term storage. The storage device, in some examples, can be described as volatile memory, meaning that the storage device does not maintain stored contents when power to object ranging system 10 is turned off. Examples of volatile memories can include random access memories (RAM), dynamic random-access memories (DRAM), static random-access memories (SRAM), and other forms of volatile memories. In other examples, the storage device is a non-volatile memory device, such as, for example, a disk-drive or flash memory.

Figure 2:
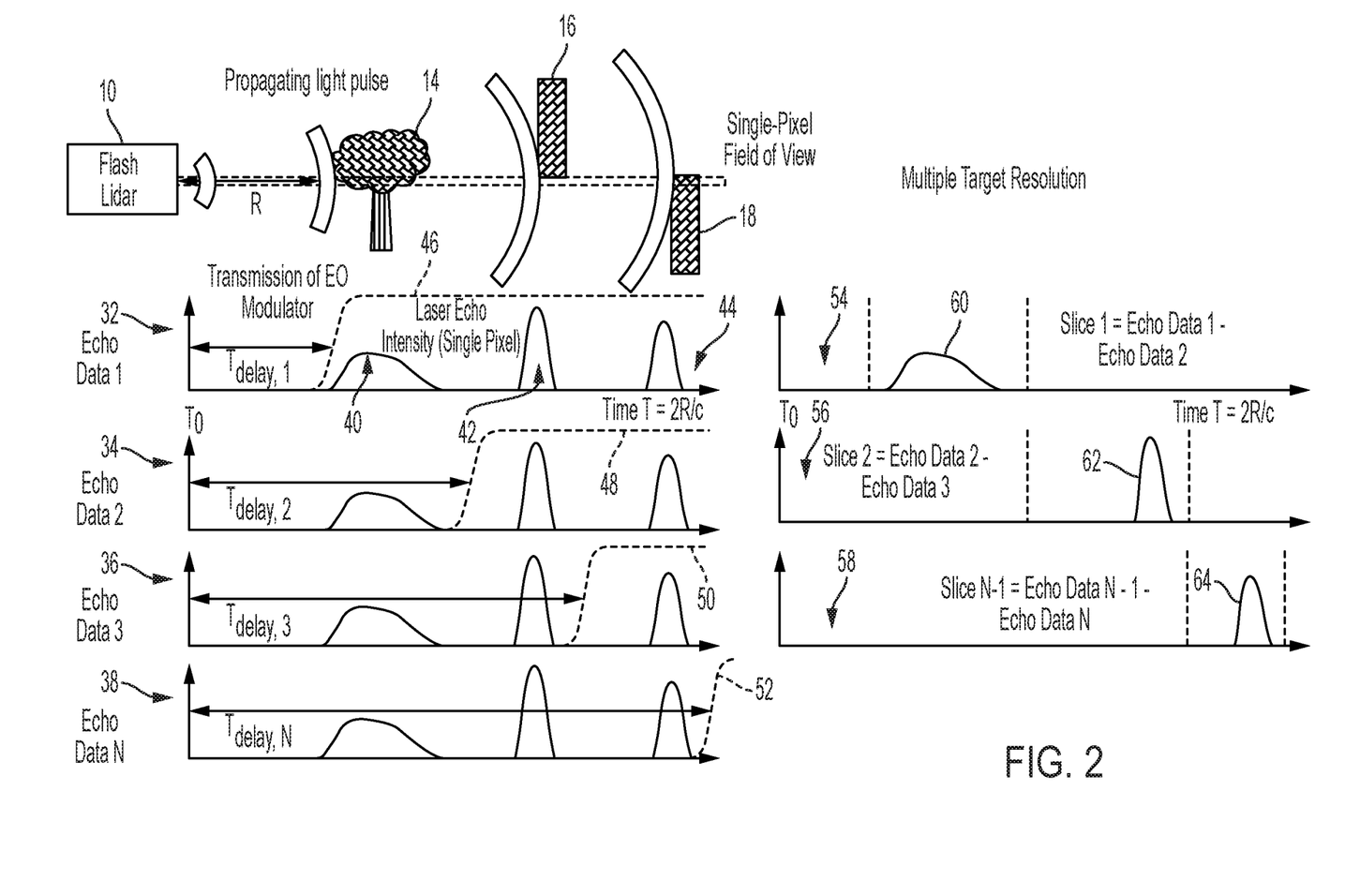
FIG. 2 is a schematic drawing depicting the portions of the projected pulse reflected by the objects in FIG. 1 for a single pixel of the optical imager.

FIG. 2 is a schematic drawing depicting the portions of the projected pulse reflected by the objects in FIG. 1 for a single pixel of the optical imager. In FIG. 1, object ranging system 10 is again shown ranging objects 14, 16 and 18 in scene 12. All three objects are aligned such that a field of view of a single pixel can receive the portions of the projected pulse reflected by all three objects 14, 16 and 18 (i.e., all three objects 14, 16 and 18 are within that field of view of the single pixel). Graphs 32, 34, 36 and 38 depicting amplitude/time relations 40, 42 and 44 (corresponding to the single pixel) of these portions of the projected pulse reflected by all three objects 14, 16 and 18 are shown below the schematic drawing of scene 10. In these graphs 32, 34, 36 and 38, the crown of tree 14 diffusely reflects portions of the projected pulse over a time span indicative of the dimension of the crown of tree 14. Solid objects 16 and 18 conversely reflect portions of the projected pulse in a short-duration time span.

Graphs 32, 34, 36 and 38 also include transmission/time relations 46, 48, 50 and 52, respectively of fast shutter 24. The series of graphs 32, 34, 36 and 38 correspond to a series of four images, each of which are illuminated by an optical pulse projected by optical pulse projector 20. In each of the series of graphs 32, 34, 36 and 38, fast shutter 24 is configured to block, at the projection time $T_0$, the portions of the projected pulse reflected by objects in scene 12. Each of the series of four graphs 32, 34, 36 and 38 corresponds to a corresponding transition time $T_1$, $T_2$, $T_3$ and $T_4$, respectively, in which fast shutter 24 transitions from the blocking the reflected portions to transmitting the reflected portions to optical imager 22.

In the top graph—graph 32, transmission/time relation 46 of fast shutter 24 indicates that all three objects 14, 16 and 18 are within the transmitted range domain (defined by transition range $R(T_1)$), and are therefore illuminated in the image captured by optical imager 22. In the next graph—graph 34, transmission/time relation 48 of fast shutter 24 indicates that only objects 16 and 18 are within the transmitted range domain (as object 14 is in the blocked range domain separated from the transmitted range domain by transition range $R(T_2)$), and are therefore illuminated in the image captured by optical imager 22. In the next graph—graph 36, transmission/time relation 50 of fast shutter 24 indicates that only object 18 is within the transmitted range domain (as objects 14 and 16 are in the blocked range domain separated from the transmitted range domain by transition range $R(T_3)$), and are therefore illuminated in the image captured by optical imager 22. Finally, in the last graph—graph 38, transmission/time relation 52 of fast shutter 24 indicates that none of objects 14, 16 and 18 are within the transmitted range domain (as objects 14, 16 and 18 are in the blocked range domain separated from the transmitted range domain by transition range $R(T_4)$), and are therefore illuminated in the image captured by optical imager 22.

FIG. 2 also includes graphs 54, 56, and 58 depicting amplitude/time relations 60, 62 and 64 (corresponding to the single pixel). Amplitude/time relations 60, 62 and 64 are taken from differential images created by taking the difference of the image data between two of the captured images corresponding to graphs 32, 34, 36 and 38. For example, graph 54 is obtained by taking the difference between amplitude/time relations 46 and 48 depicted in graphs 32 and 34, respectively. Graph 54 shows the image data signature of tree 14 only, as image data corresponding to objects 16 and 18 have been annihilated by the difference operation. Thus, tree 14 has a range between transition ranges $R(T_1)$ and $R(T_2)$. Graph 56 is obtained by taking the difference between amplitude/time relations 48 and 50 depicted in graphs 34 and 36, respectively. Graph 56 shows the image data signature of object only, as image data corresponding to object 18 have been annihilated by the difference operation. Thus, object 16 has a range between transition ranges $R(T_2)$ and $R(T_3)$. Graph 58 is obtained by taking the difference between amplitude/time relations 50 and 52 depicted in graphs 36 and 38, respectively. Graph 58 shows the image data signature of tree 18 only. Thus, object 18 has a range between transition ranges $R(T_3)$ and $R(T_4)$.

Although FIG. 2 depicts only four images corresponding to four different interface times T1, T2, T3 and T4, more or fewer time slice images can be performed so as to provide better or worse range resolution. For example, one can improve range resolution by capturing more images corresponding to more interface times $T_N$. Such improved range resolution comes at the expense of capturing more images and performing more image processing (i.e., calculating more difference images). The time slice resolution can be adaptively performed in some embodiments. For example, in some embodiments, objects that are determined to be within a potential collision zone of the image's field of view can be range resolved to high resolution by repeated image capture using a series of interface times configured to better refine the range determination of the object. For example, a binary search sequence can be used, in a new interface time that is between (e.g., $$\frac{T_N + T_{N+1}}{2}$$

) the bounding interface times $T_N$ and $T_{N+1}$ that have previously determined the transmitted range domain within which the imaged object is illuminated in the corresponding difference image. Such a binary search can be repeated until the requisite range resolution of the object is obtained.

Figure 3:
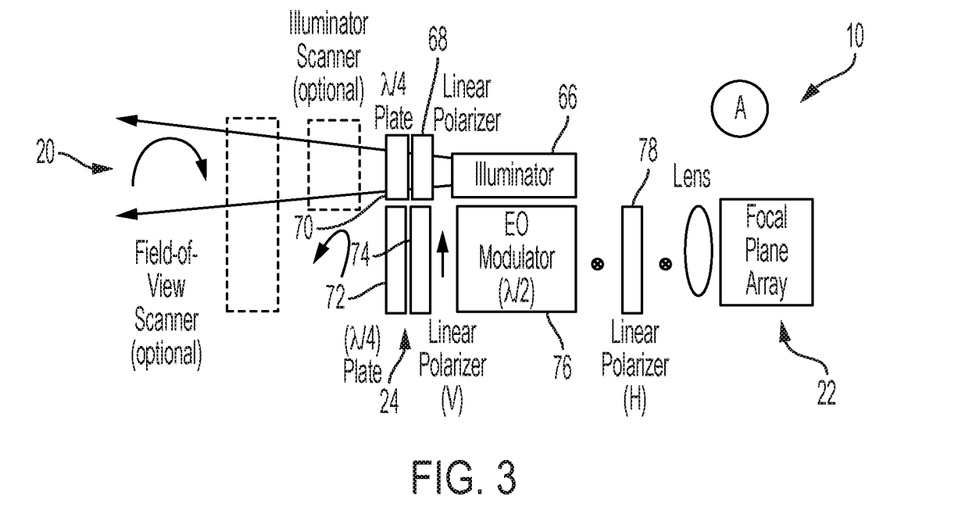
FIG. 3 depicts an embodiment of a ranging system using an electro-optical modulator for fast shutter operation.

FIG. 3 depicts an embodiment of a ranging system using an electro-optical modulator for fast shutter operation. In FIG. 3, object ranging system 10 includes optical pulse projector 20, optical imager 22, and fast shutter 24. Not depicted in FIG. 3 are image processor 26 and range calculator 28. Optical pulse projector 20 includes illuminator 66, linear polarizer 68, and quarter wave plate 70, which together project a circularly polarized optical pulse onto a scene aligned with an optical axis of optical pulse projector 20. Fast shutter 24 is aligned along an optical axis of optical imager 22 so as to either block or transmit, from/to optical imager 22, portions of the projected optical pulse reflected by objects in the scene. Optical imager 22 can be any imaging device capable of capturing an image of the scene.

Fast shutter 24 is formed by quarter wave plate 72, linear polarizer 74, half-wave Electro-Optical (EO) modulator 76 and linear polarizer 78. Portions of the projected optical pulse reflected by the scene will be converted from circular polarization to linear polarization by quarter wave plate 72. Then only those linearly polarized portions of the projected optical pulse reflected by the scene that are polarized in a first polarization state (as determined by linear polarizer 74) will be transmitted to EO modulator 76. EO modulator 76 then selectively rotates the polarization from the first state of the reflected portions transmitted thereto to a second state orthogonal with the first state. EO modulator 76 performs such selective rotation in response to a control signal. Thus, the control signal controls whether EO modulator 76 rotates the received linearly polarized reflected portion or does not rotate the received linearly polarized reflected portion. If and when EO modulator rotates the linearly polarized reflected portion so as to align with linear polarizer 78, such portions are transmitted to optical imager 22. If and when, however, EO modulator rotates the linearly polarized reflected portion so as to be orthogonal to linear polarizer 78, such portions are blocked from and not transmitted to optical imager 22. Thus, EO modulator, along with quarter wave plate 72, linear polarizer 74, and linear polarizer 78, operate as a fast shutter in response to a control signal.

Figure 4:
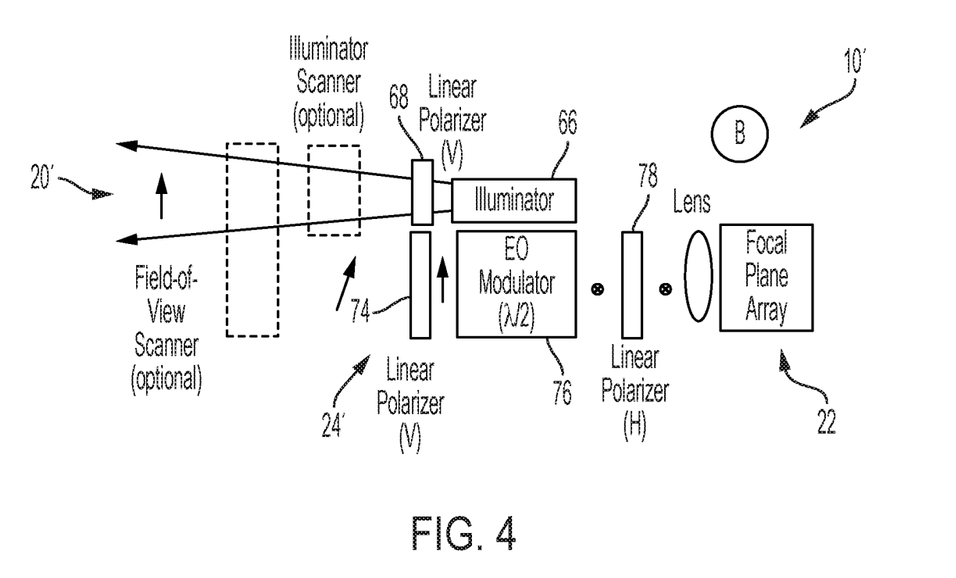
FIG. 4 is another embodiment of a ranging system using an electro-optical modulator for fast shutter operation.

FIG. 4 is another embodiment of a ranging system using an electro-optical modulator for fast shutter operation. In FIG. 4, object ranging system 10' includes optical pulse projector 20', optical imager 22, and fast shutter 24'. Not depicted in FIG. 4 are image processor 26 and range calculator 28. Optical pulse projector 20' includes illuminator 66 and linear polarizer 68, which together project a linearly polarized optical pulse onto a scene aligned with an optical axis of optical pulse projector 20. Fast shutter 24' is aligned along an optical axis of optical imager 22 so as to either block or transmit, from/to optical imager 22, portions of the projected optical pulse reflected by objects in the scene. Fast shutter 24' operates on linearly polarized light instead of circularly polarized light described with reference to the FIG. 3 embodiment. Optical imager 22 can again be any imaging device capable of capturing an image of the scene.

Fast shutter 24' is formed by linear polarizer 74, half-wave Electo-Optical (EO) modulator 76, and linear polarizer 78. Only portions of the projected optical pulse reflected by the scene that are polarized in a first polarization state (as determined by linear polarizer 74) will be transmitted to EO modulator 76. EO modulator 76 then selectively rotates the polarization from the first state of the reflected portions transmitted thereto to a second state orthogonal with the first state. EO modulator 76 performs such selective rotation in response to a control signal. Thus, the control signal controls whether EO modulator 76 rotates the received linearly polarized reflected portion or does not rotate the received linearly polarized reflected portion. If and when EO modulator rotates the linearly polarized reflected portion so as to align with linear polarizer 78, such portions are transmitted to optical imager 22. If and when, however, EO modulator rotates the linearly polarized reflected portion so as to be orthogonal to linear polarizer 78, such portions are blocked from and not transmitted to optical imager 22. Thus, EO modulator, along with linear polarizer 74, and linear polarizer 78, operate as a fast shutter in response to a control signal.

Figure 5:
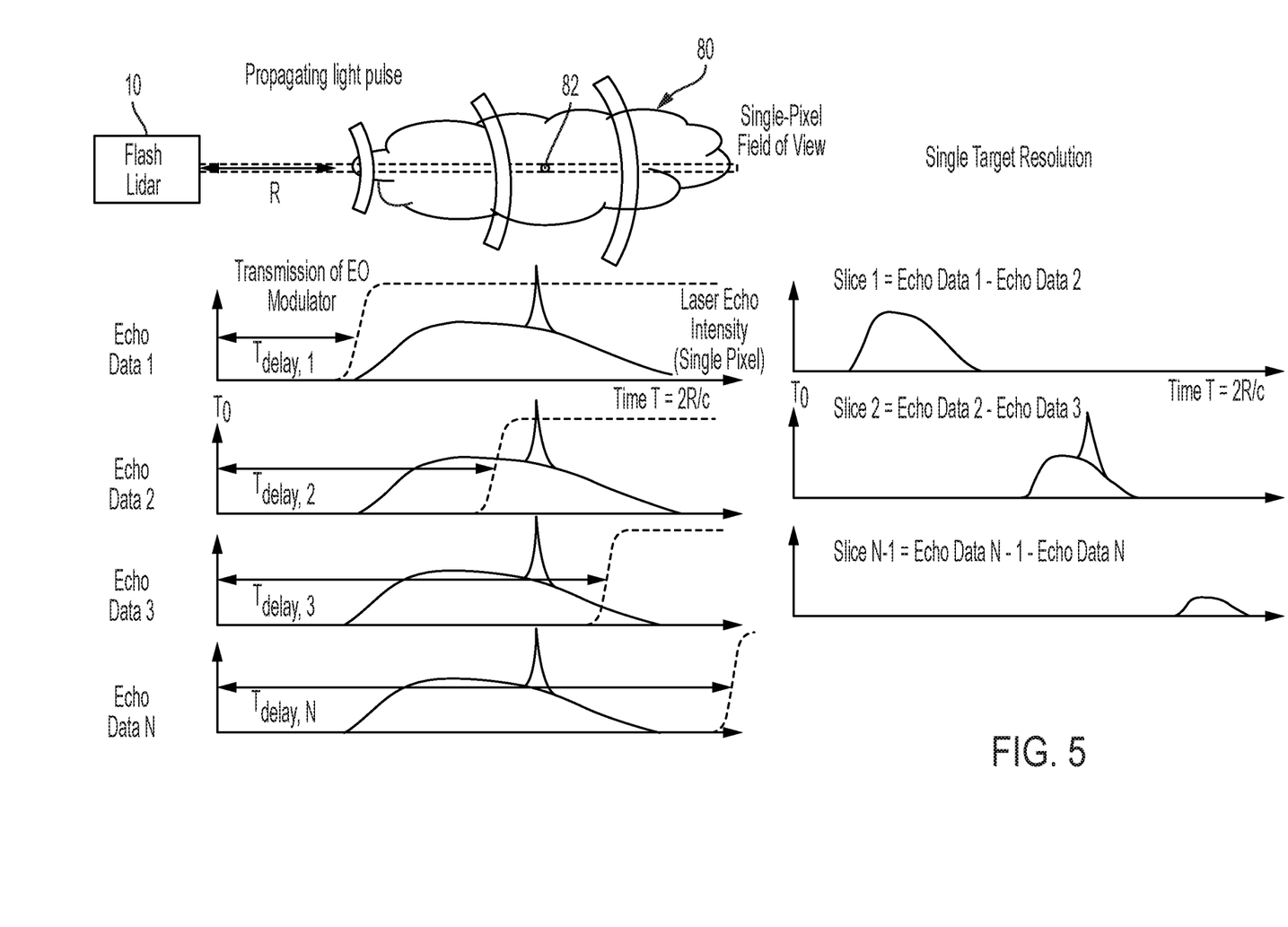
FIG. 5 is a schematic diagram depicting a time sequence of image data of a diffuse object for a single pixel's field of view.

Object ranging systems 10 and 10' as described above can provide various beneficial information. For example, some embodiments can provide range data of large particles that reside in a diffuse cloud atmosphere. FIG. 5 is a schematic diagram depicting a time sequence of image data of a diffuse object for a single pixel's field of view. In FIG. 5, object ranging system 10 is shown ranging a diffuse cloud atmosphere 80. Within diffuse cloud atmosphere are one or more large ice particles 82 (or other solid particles). By time slicing the captured imagery as described above with reference to FIG. 2, the uniformity of cloud atmosphere 80 can be determined. Graphs below object ranging system 10 and could atmosphere 80 depict the amplitude/time relations of a single pixel, as was similarly shown in FIG. 2 above. Again, difference data are also shown in FIG. 5, as was shown in FIG. 2 above. Note that the difference data corresponding to a range domain between transition ranges $R(T_2)$ and $R(T_3)$ show a large scintillation spike indicative of a large ice particle. Such a scintillation spike contributes to the amplitude of the image data, thereby indicating the presence of a large particle within the range domain of the difference image.

Figure 6:
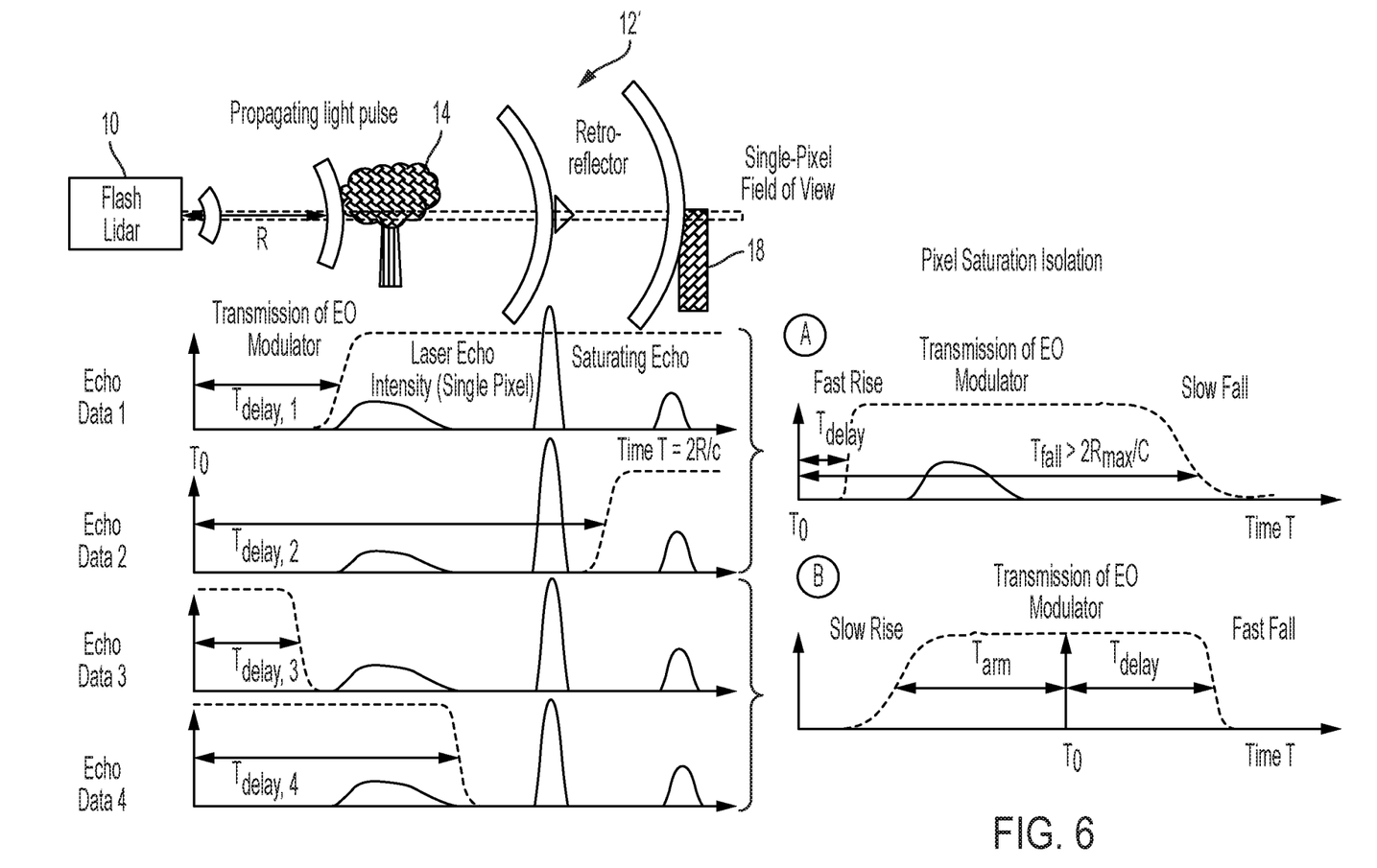
FIG. 6 is a schematic diagram depicting saturation avoidance using both shutter-open and shutter-close control.

Some embodiments can avoid saturation of image data resulting from efficient reflectors in the field of view. FIG. 6 is a schematic diagram depicting a time sequence of image data of multiple objects within a single pixel's field of view. In FIG. 6, scene 12' includes tree 14, retro-reflector 16 and solid object 18. Retro-reflector 16 is a very efficient reflecting object, and is therefore capable of saturating the image data captured by optical imager 22. Saturation of image data can cause problems with regard to determining accurate ranging of objects within the field of view. Such saturation can cause problems not only with regard to the pixels aligned with the retro-reflector, but also with other pixels in a focal plane array. Therefore, avoiding saturation can improve ranging of objects in scene 12'.

If saturation of image data is detected, object ranging system can be used in two modes so as to avoid such saturation. In a first mode, object ranging system can configure fast shutter 24 to transmit reflected portions at the projection time $T_0$. Then a series of images can be obtained for time slices determined by transition times $T_1$, $T_2$, etc. until a saturation time $T_{SAT}$ when saturation is detected. In a second mode, object ranging system can configure fast shutter 24 to block reflected portion at the projection time $T_0$. Then a series of images can be obtained for time slices determined by transition time beginning a $T_{SAT}$ and continuing to longer times $T_{SAT+1}$, $T_{SAT+2}$, etc. until the desired range limit for ranging objects in the scene is obtained. Using these data, the object that saturates the image data can be ranged as well as other objects in scene 10'.

Various embodiments can use various types of optical pulse projectors. For example, in some embodiments, the optical pulse projector can be a visible-light pulse projector. In other embodiments, the optical pulse projector can be an infrared-light pulse projector.

Discussion of Possible Embodiments

The following are non-exclusive descriptions of possible embodiments of the present invention.

Apparatus and associated methods relate to a system for ranging of objects in a scene. The system includes an optical pulse projector configured to project a time sequence of optical pulses onto the scene. The system includes an optical imager having an optical axis aligned so as to receive reflected portions of the time sequence of optical pulses projected onto a scene and reflected by the objects in the scene. Based on the reflected portions received, the optical imager forms a time sequence of two-dimensional images of the scene, each corresponding to a corresponding one of the time sequence of optical pulses projected. The system includes a fast shutter aligned along the optical axis of the optical imager so as to controllably transmit the reflected portions to the optical imager and/or block the reflected portions from the optical imager. The system includes a timing controller configured to coordinate shutter timing of the fast shutter, so as to transmit the reflected portions to the optical imager for object having ranges within a range domain and to block the reflected portions from the optical imager for objects not within the range domain. The system includes an image processor configured to generate difference images between two of the time sequence of two-dimensional images captured using two different shutter timings corresponding to two different range domains. The system also includes a range calculator configured to determine the ranges of objects identified in the difference images as being within a subrange calculated as being a difference between the range domains of the two of the sequence of two-dimensional images used to calculate the difference image.

The system of the preceding paragraph can optionally include, additionally and/or alternatively, any one or more of the following features, configurations and/or additional components:

A further embodiment of the foregoing system, wherein the range domain can be measured as a domain of ranges of objects as measured from a location at which the system resides.

A further embodiment of any of the foregoing systems, wherein a time delay between adjacent-in-time pairs of the time sequence of optical pulses can be determined based on a maximum range of objects to be ranged in the scene.

A further embodiment of any of the foregoing systems, wherein shutter timing of the fast shutter can be coordinated to facilitate capture of images of objects within the range domain corresponding to the shutter timing coordinated.

A further embodiment of any of the foregoing systems, wherein the timing controller can coordinate shutter timing between adjacent-in-time pairs of the time sequence of optical pulses.

A further embodiment of any of the foregoing systems, wherein the shutter timing coordinated can include a shutter-open time delay between a projection time corresponding to a time at which the optical pulse is projected and an open-shutter time at which the shutter transitions from blocking to transmitting the reflected portions, thereby determining a near extreme or minimum of the range domain.

A further embodiment of any of the foregoing systems, wherein the range domains corresponding to the two of the sequence of two-dimensional images used to calculate the difference image can have different open-shutter times.

A further embodiment of any of the foregoing systems, wherein the shutter timing coordinated can include a shutter-close time delay between a projection time corresponding to a time at which the optical pulse is projected and a close-shutter time at which the shutter transitions from transmitting to blocking the reflected portions, thereby determining a far extreme or maximum of the range domain.

A further embodiment of any of the foregoing systems, wherein the range domains corresponding to the two of the sequence of two-dimensional images used to calculate the difference image can have different close-shutter times.

A further embodiment of any of the foregoing systems, wherein the image processor can be further configured to identify, within the difference image, pixel regions having pixel values above a threshold value. The identified pixel regions correspond to the objects at ranges within the subrange.

A further embodiment of any of the foregoing systems, wherein the system can be further configured to generate a set of difference images from a set of two-dimensional images, each corresponding to a different subrange.

A further embodiment of any of the foregoing systems, wherein the optical detector can include a first polarizing filter, a second polarizing filter, and an electro-optical modulator. The first polarizing filter can be of a first polarization state. The second polarizing filter can be of a second polarization state. The electro-optical modulator can be located between the first and second polarization filters and configured to controllably change the polarization of the reflected portion transmitted therethrough in response to an electrical signal.

A further embodiment of any of the foregoing systems, wherein the electro-optical modulator can be configured to controllably transmit light to the second polarization filter in either of the second polarization state or a polarization state orthogonal to the second polarization state, thereby transmitting the reflected portions therethrough or blocking the reflected portions thereby, respectively.

A further embodiment of any of the foregoing systems, wherein the optical detector can include a signal generator configured to generate the electrical signal and to provide the electrical signal generated to the electro-optical modulator.

A further embodiment of any of the foregoing systems, wherein the optical detector can include an optical camera configured to focus the reflected portions onto a focal plane array so as to produce the two-dimensional images of the scene.

A further embodiment of any of the foregoing systems, wherein the optical pulse projector can be configured to project optical pulses of infrared light.

A further embodiment of any of the foregoing systems, wherein the optical imager can be sensitive to infrared light.

Some embodiments relate to a method for ranging of objects in a scene. The method includes projecting, via an optical pulse projector, a time sequence of optical pulses onto the scene. The method includes forming, via an optical imager having an optical axis aligned so as to receive reflected portions of the time sequence of optical pulses projected onto a scene and reflected by the objects in the scene, a time sequence of two-dimensional images of the scene, each corresponding to a corresponding one of the time sequence of optical pulses projected. The method includes controllably transmitting and/or blocking, via a fast shutter aligned along the optical axis of the optical imager, the reflected portions to and/or from the reflected portions from the optical imager. The method includes coordinating, via a timing controller, shutter timing of the fast shutter, so as to transmit the reflected portions to the optical imager for object having ranges within a range domain and to block the reflected portions from the optical imager for objects not within the range domain. The method includes generating, via an image processor, difference images between the two of the time sequence of two-dimensional images captured using two different shutter timings corresponding to two different range domains. The method also includes determining, via a range calculator, the ranges of objects identified in the difference images as being within a subrange calculated as being a difference between the range domains of the two of the sequence of two-dimensional images used to calculate the difference image.

The method of the preceding paragraph can optionally include, additionally and/or alternatively, any one or more of the following features, configurations and/or additional components:

A further embodiment of the foregoing method, wherein controllably transmitting and/or blocking can include polarizing, via a first polarizing filter, the reflected portions to a first polarization state. Controllable transmitting and/or blocking can further include controllably changing, via an electro-optical modulator, polarization of the reflected portions polarized to the first polarization. Controllably transmitting and/or blocking can also include polarizing, via a second polarizing filter, the reflected portion, which has a polarization controllably changed, to the second polarization.

A further embodiment of any of the foregoing methods can further include identifying, via the image processor, pixel regions corresponding to pixel values above a threshold value, based on the difference image, the identified pixel regions corresponding to the objects at ranges within the subrange.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for ranging of objects in a scene, the system comprising:
    an optical pulse projector configured to project a time sequence of optical pulses onto the scene;
    an optical imager having an optical axis aligned so as to receive reflected portions of the time sequence of optical pulses projected onto a scene and reflected by the objects in the scene, so as to form a time sequence of two-dimensional images of the scene, each corresponding to a corresponding one of the time sequence of optical pulses projected;
    a fast shutter aligned along the optical axis of the optical imager so as to controllably transmit the reflected portions to the optical imager and/or block the reflected portions from the optical imager;
    a timing controller configured to coordinate shutter timing of the fast shutter, so as to transmit the reflected portions to the optical imager for object having ranges within a range domain and to block the reflected portions from the optical imager for objects not within the range domain;
    an image processor configured to generate difference images between two of the time sequence of two-dimensional images captured using two different shutter timings corresponding to two different range domains; and
    a range calculator configured to determine the ranges of objects identified in the difference images as being within a subrange calculated as being a difference between the range domains of the two of the time sequence of two-dimensional images used to calculate the difference image.

2. The system of claim 1, wherein the range domain is measured as a domain of ranges of objects as measured from a location at which the system resides.

3. The system of claim 1, wherein a time delay between adjacent-in-time pairs of the time sequence of optical pulses is determined based on a maximum range of objects to be ranged in the scene.

4. The system of claim 1, wherein shutter timing of the fast shutter is coordinated to facilitate capture of images of objects within the range domain corresponding to the shutter timing coordinated.

5. The system of claim 1, wherein the timing controller coordinates shutter timing between adjacent-in-time pairs of the time sequence of optical pulses.

6. The system of claim 5, wherein the shutter timing coordinated includes a shutter-open time delay between a projection time corresponding to a time at which the optical pulse is projected and an open-shutter time at which the shutter transitions from blocking to transmitting the reflected portions, thereby determining a near extreme or minimum of the range domain.

7. The system of claim 6, wherein the range domains corresponding to the two of the time sequence of two-dimensional images used to calculate the difference image have different open-shutter times.

8. The system of claim 5, wherein the shutter timing coordinated includes a shutter-close time delay between a projection time corresponding to a time at which the optical pulse is projected and a close-shutter time at which the shutter transitions from transmitting to blocking the reflected portions, thereby determining a far extreme or maximum of the range domain.

9. The system of claim 8, wherein the range domains corresponding to the two of the time sequence of two-dimensional images used to calculate the difference image have different close-shutter times.

10. The system of claim 1, wherein the image processor is further configured to identify, within the difference image, pixel regions having pixel values above a threshold value, the identified pixel regions corresponding to the objects at ranges within the subrange.

11. The system of claim 1, wherein the system is further configured to generate a set of difference images from a set of two-dimensional images, each corresponding to a different subrange.

12. The system of claim 1, wherein the optical detector includes;
   a first polarizing filter aligned of a first polarization state;
   a second polarizing filter of a second polarization state; and
   an electro-optical modulator between the first and second polarization filters and configured to controllably change the polarization of the reflected portion transmitted therethrough in response to an electrical signal.

13. The system of claim 12, wherein the electro-optical modulator is configured to controllably transmit light to the second polarization filter in either of the second polarization state or a polarization state orthogonal to the second polarization state, thereby transmitting the reflected portions therethrough or blocking the reflected portions thereby, respectively.

14. The system of claim 12, wherein the optical detector includes: a signal generator configured to generate the electrical signal and to provide the electrical signal generated to the electro-optical modulator.

15. The system of claim 1, wherein the optical detector includes: an optical camera configured to focus the reflected portions onto a focal plane array so as to produce the two-dimensional images of the scene.

16. The system of claim 1, wherein the optical pulse projector is configured to project optical pulses of infrared light.

17. The system of claim 1, wherein the optical imager is sensitive to infrared light.

18. A method for ranging of objects in a scene, the method comprising:
   projecting, via an optical pulse projector, a time sequence of optical pulses onto the scene;
   forming, via an optical imager having an optical axis aligned so as to receive reflected portions of the time sequence of optical pulses projected onto a scene and reflected by the objects in the scene, a time sequence of two-dimensional images of the scene, each corresponding to a corresponding one of the time sequence of optical pulses projected;
   controllably transmitting and/or blocking, via a fast shutter aligned along the optical axis of the optical imager, the reflected portions to and/or from the reflected portions from the optical imager;
   coordinating, via a timing controller, shutter timing of the fast shutter, so as to transmit the reflected portions to the optical imager for object having ranges within a range domain and to block the reflected portions from the optical imager for objects not within the range domain;
   generating, via an image processor, difference images between the two of the time sequence of two-dimensional images captured using two different shutter timings corresponding to two different range domains; and
   determining, via a range calculator, the ranges of objects identified in the difference images as being within a subrange calculated as being a difference between the range domains of the two of the time sequence of two-dimensional images used to calculate the difference image.

19. The method of claim 18, wherein controllably transmitting and/or blocking includes:
   polarizing, via a first polarizing filter, the reflected portions to a first polarization state;
   controllably changing, via an electro-optical modulator, polarization of the reflected portions polarized to the first polarization; and
   polarizing, via a second polarizing filter, the reflected portion, which has a polarization controllably changed, to the second polarization.

20. The method of claim 18, further comprising:
   identifying, via the image processor, pixel regions corresponding to pixel values above a threshold value, based on the difference image, the identified pixel regions corresponding to the objects at ranges within the subrange.

* * * * *